1,794,786

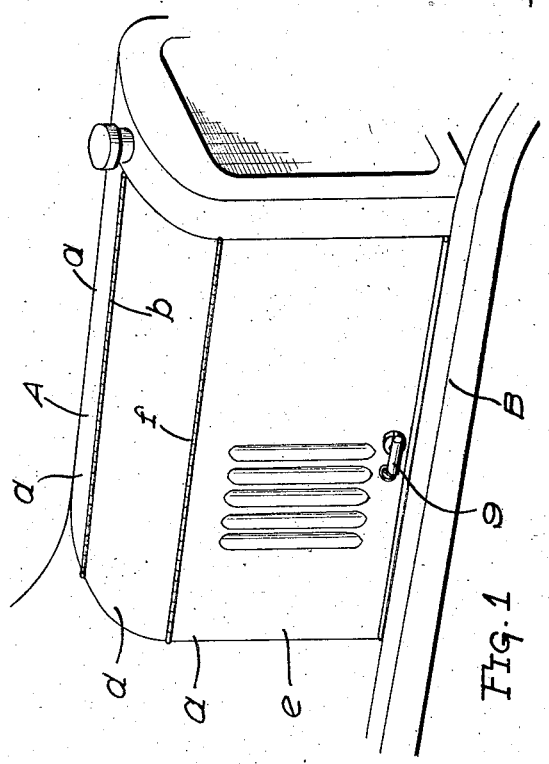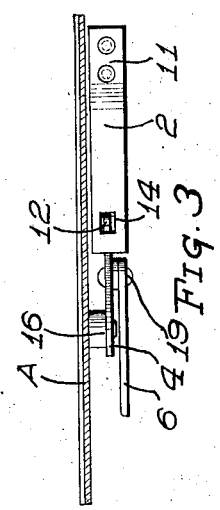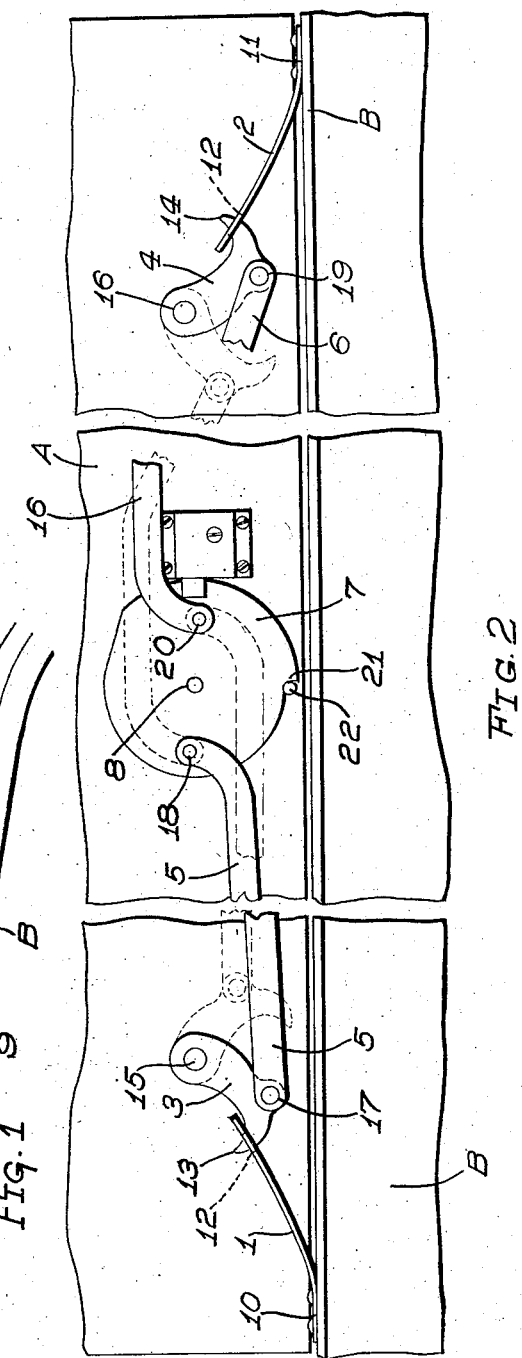
March 3, 1931.  A. C. McBRIDE ET AL  1,794,786
AUTOMOBILE HOOD HOLDING MEANS
Filed Oct. 29, 1926
INVENTORS
ARTHUR C. McBRIDE
FREDERICK W. RENWORTH
BY A.B.Bowman
ATTORNEY Patented Mar. 3, 1931

UNITED STATES PATENT OFFICE

ARTHUR C. McBRIDE AND FREDERICK W. RENWORTH, OF SAN DIEGO, CALIFORNIA, ASSIGNORS OF ONE-THIRD TO CHARLES H. E. REMONDINO, OF SAN DIEGO, CALIFORNIA

AUTOMOBILE HOOD-HOLDING MEANS

Application filed October 29, 1926. Serial No. 144,966.

This invention relates to securing devices, and more particularly to a device for securing an automobile hood in closed position.

The objects of the invention are: first, to provide a securing device for securing an automobile hood closed at both ends which may be manipulated by a single handle to secure or release the hood; second, to provide a securing device for an automobile hood, including one flat spring at each end of the hood constructed and arranged to resiliently hold the hood down and against end play or shifting and to resiliently lock the hood closed, and third, to provide an automobile hood securing device of the character stated which will be simple in construction and practical and efficient in operation.

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a perspective view of an automobile hood with our securing device applied thereto; Fig. 2 is an inside side elevation of our securing device applied to an automobile hood, showing the inside of the hood, and Fig. 3 is a fragmentary plan view of one of the dogs and springs, shown interlocked.

Similar characters of reference refer to similar parts and portions throughout the several views of the drawings.

In the drawings we have illustrated a conventional automobile hood, designated A, and an automobile frame, designated B, said hood including two members $a$, hinged together at the top at $b$, each of said members being divided into an upper section $d$ and a lower side section $e$, which sections are hinged together at $f$.

Our invention comprises two flat springs 1 and 2, a pair of interlocking dogs 3 and 4, a pair of links 5 and 6, a crank disc 7, a crank shaft 8, and a crank handle 9. As our invention is duplicated on each side of the hood A, a description of its application to one side will answer for both sides.

The springs 1 and 2 are secured to the automobile frame B at the ends respectively of the hood A, as indicated at 10 and 11 and extend upwardly from said frame towards the dogs 3 and 4 respectively. The springs 1 and 2 are each provided in their upper ends with slots 12 to receive the hooked ends 13 and 14 of the dogs 3 and 4 respectively. Said dogs are pivoted to the inside of the side section $e$ of the hood at 15 and 16. The link 5 is connected at one end to the dog 3 at 17 and at its other end to the crank disc 7 at 18. The link 6 is connected at one end to the dog 4 at 19 and at its other end to the crank disc 7 at 20. The crank disc 7 is formed with a tooth 21 on its periphery for engaging a pin 22 on the inside of the hood section $e$. The crank disc 7 is secured on the inner end of the crank shaft 8 which is journaled in and extends through the lower part of the hood section $e$. The handle 9 is secured on the outer end of the crank shaft 8 outside the hood.

To secure the hood closed, the members $a$ being swung down into closed position, the handle 9 is grasped and rotated to rotate the shaft 8 and crank disc 7 until the tooth 21 engages the pin 22, during which operation the dogs 3 and 4, through their links 5 and 6, are swung upwardly until the ends 13 and 14 of the dogs pass through the slots 12 in the upper ends of the springs 1 and 2 and interlock with the springs so as to hold them in tension. In this position of the parts the pivot connections 18 and 20 of the links 5 and 6 to the disc 7, are in such position that the pressure of the springs 1 and 2 is applied through the dogs 3 and 4 and said links will tend to rotate the disc 7 clockwise (Fig. 2), thus maintaining the tooth 21 against the pin 22 and effectively holding the parts in securing position, whereby the hood is resiliently held closed and against end play or shifting, and resiliently locked in closed position.

When it is desired to release the hood so as to open the same, it is only necessary to rotate the disc in the opposite direction to disengage the dogs from the springs.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. An automobile hood securing device, including a pair of flat springs rigidly secured to the automobile frame at the ends respectively at the inside of the hood and extending upwardly at an angle, said springs having slots in their upper ends, a pair of dogs pivotally mounted inside of the hood, a crank-shaft journaled in and extending through the side wall of the hood, a crank disc on the inner end of said shaft, links connecting said crank disc and said dogs, a handle on the outer end of said shaft for rotating said shaft and disc to cause the ends of said dogs to extend through the slots in said springs to interlock with the springs and hold the same in tension, a pin on the hood, and a tooth on said disc for engaging said pin to limit the rotation of the disc and the dogs in interlocking position with said springs.

2. An automobile hood securing device, including a pair of flat springs rigidly secured to the automobile frame at the ends respectively at the inside of the hood and extending upwardly at an angle, said springs having slots in their upper ends, a pair of dogs pivotally mounted inside of the hood, a crank shaft journaled in and extending through the side wall of the hood, a crank disc on the inner end of said shaft, links connecting said crank disc and said dogs, a handle on the outer end of said shaft for rotating said shaft and disc to cause the ends of said dogs to extend through the slots in said springs to interlock with the springs and hold the same in tension, a pin on the hood, and a tooth on said disc for engaging said pin to limit the rotation of the disc and the dogs in interlocking position with said springs, said links being connected to said discs at such points that when said tooth engages said pin, the pressure of the springs upon said dogs and said links will tend to rotate the disc to hold said tooth against said pin.

3. An automobile hood securing device, including a pair of flat springs rigidly secured to the automobile frame at the ends respectively at the inside of the hood and extending upwardly at an angle, a crank shaft journaled in and extending through the side wall of the hood, a crank disc on the inner end of said shaft, a handle on the outer end of said shaft, a pair of dogs, pivotally mounted inside of the hood, links connecting said disc and said dogs, means for securing said dogs to interlock with said springs when said disc and shaft are rotated by said handle in a given direction, and means for limiting the rotation of said disc and shaft when said dogs are interlocked with said springs, said links being connected to said discs at such points that when the rotation of said disc is limited by said limiting means the pressure of the springs against said dogs and links will tend to further rotate the disc against said limiting means.

4. An automobile hood securing device, including a pair of flat springs secured at one end to the automobile frame adjacent the ends and within the hood and extending towards each other and upwardly at an angle to said frame, means pivotally mounted on the inner side of the hood near the free-ends of said springs adapted to be moved into engagement with the lower surface of said springs and to be resiliently restrained against upward displacement thereby, and means operable from the outside of said hood for moving said pivoted means into engagement with said springs, and restraining said pivoted means from disengagement therewith.

5. In an automobile hood securing device, the combination with the frame and hood of an automobile, of a pair of yieldable keepers secured to the frame and extending upwardly, a crank shaft journaled in and extending through the side wall of the hood and having a handle on the outer end thereof, a pair of dogs pivotally mounted on the inside of the hood, links connecting said crank shaft and said dogs, said dogs being adapted to interlock with the keepers when the shaft is rotated in a certain direction, and means for limiting the rotation of said shaft when said dogs are interlocked with said keepers, said links being connected to said shaft at such point that when the rotation of said shaft is limited by said limiting means, the force of the keepers against said dogs and links will tend further to rotate said shaft against said limiting means.

In testimony whereof, we have hereunto set our hands at San Diego, California, this 21st day of October, 1926.

ARTHUR C. McBRIDE.
FREDERICK W. RENWORTH.